(12) United States Patent
Bianco

(10) Patent No.: US 8,981,716 B2
(45) Date of Patent: Mar. 17, 2015

(54) POWER SHARE SYSTEM FOR ELECTRIC VEHICLE SERVICE EQUIPMENT

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 705 days.

(21) Appl. No.: 13/206,142

(22) Filed: Aug. 9, 2011

(65) Prior Publication Data

US 2012/0032636 A1 Feb. 9, 2012

Related U.S. Application Data

(60) Provisional application No. 61/447,901, filed on Mar. 1, 2011, provisional application No. 61/371,866, filed on Aug. 9, 2010.

(51) Int. Cl.
| | |
|---|---|
| H02J 7/00 | (2006.01) |
| H02J 7/02 | (2006.01) |
| B60L 3/04 | (2006.01) |
| B60L 11/18 | (2006.01) |
| H02J 3/14 | (2006.01) |

(52) U.S. Cl.
CPC . *H02J 7/022* (2013.01); *B60L 3/04* (2013.01); *B60L 11/1812* (2013.01); *B60L 11/1816* (2013.01); *B60L 11/1824* (2013.01); *B60L 11/184* (2013.01); *B60L 11/1844* (2013.01); *H02J 3/14* (2013.01); *B60L 2240/529* (2013.01); *H02J 2003/143* (2013.01); *Y02B 70/3225* (2013.01); *Y02B 70/3266* (2013.01); *Y02T 10/7088* (2013.01); *Y02T 10/7005* (2013.01); *Y02T 90/163* (2013.01); *Y02T 90/168* (2013.01); *Y02T 90/169* (2013.01); *Y02T 90/121* (2013.01); *Y02T 90/14* (2013.01); *Y02T 90/128* (2013.01); *Y02T 90/127* (2013.01); *Y04S 10/126* (2013.01); *Y04S 20/222* (2013.01); *Y04S 20/242* (2013.01); *Y04S 30/12* (2013.01); *Y04S 30/14* (2013.01); *Y02E 60/721* (2013.01)
USPC ........................................................ 320/109

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | | |
|---|---|---|---|---|
| 5,548,200 | A * | 8/1996 | Nor et al. | 320/109 |
| 7,688,024 | B2 * | 3/2010 | Kamaga | 320/104 |
| 8,594,859 | B2 * | 11/2013 | Contreras Delpiano et al. | 701/2 |
| 2006/0219448 | A1 * | 10/2006 | Grieve et al. | 180/65.3 |
| 2009/0062967 | A1 * | 3/2009 | Kressner et al. | 700/286 |
| 2009/0096416 | A1 * | 4/2009 | Tonegawa et al. | 320/109 |
| 2010/0017249 | A1 * | 1/2010 | Fincham et al. | 705/8 |
| 2011/0010043 | A1 * | 1/2011 | Lafky | 701/33 |
| 2011/0175569 | A1 * | 7/2011 | Austin | 320/109 |
| 2014/0097795 | A1 * | 4/2014 | Turner et al. | 320/109 |

* cited by examiner

Primary Examiner — Arun Williams
(74) Attorney, Agent, or Firm — Alix, Yale & Ristas, LLP

(57) ABSTRACT

A power sharing system employs an easily installed power share module for controlling the operation of an EVSE for charging an electric vehicle. The power module senses the power load of an appliance or of a service line to a remote residential unit and transmits a command signal to the EVSE. The power control module is configurable to transmit an on/off signal to the EVSE or a control level signal to the EVSE for controlling the charging by the EVSE in accordance with the available power due to the load of the appliance or the service line load.

20 Claims, 20 Drawing Sheets

POWER SHARE SYSTEM FOR ELECTRIC VEHICLE SERVICE EQUIPMENT

CROSS-REFERENCE TO RELATED APPLICATION

This application claims the priority of U.S. Provisional Patent Application No. 61/447,901 filed on Mar. 1, 2011 and U.S. Provisional Patent Application No. 61/371,866 filed on Aug. 9, 2010, the disclosures of which are incorporated by reference in their entirety.

BACKGROUND

This disclosure relates generally to devices and methods for supplying electric power to electric vehicle service equipment ("EVSE") for charging electric vehicles. More particularly, this disclosure relates to devices and methods for interfacing with an existing local power supply, such as the power supply to a residence, to provide sufficient electrical power for EVSE.

When a home owner or resident purchases an electric vehicle, he will likely need to install EVSE to supply electrical power for charging the battery power unit of the electric vehicle. The EVSE installations must meet national and electrical codes. Most single family residences have garages or carports equipped with an electrical outlet that typically supplies 120V AC at 15 A. This power is typically inadequate to charge in a reasonable time the newer vehicles with larger batteries. It is practically required to supply these vehicles with 220V AC at 20 to 40 amps. This is easily accomplished in newer homes with power lines and service panels having ratings of 200 amps or more. However, the large majority of older homes, even with service panels that supply 220/240V AC, typically have amp service limited to 60 or 100 amps with little or no spare capacity. Installing new service lines and larger panels is a costly, time consuming process raising the initial cost of owning an electric vehicle to the point where it may not be economically affordable.

There are similar issues for situations wherein EVSE is installed in multi-unit dwellings, apartment facilities and condominiums. Service panels for multi-dwelling residences are typically located at substantial distances from where the vehicle is parked. It is advantageous if the EVSE usage is directly coordinated with the power lines for the unit of the owner of the electric vehicle.

Most service panels when installed for economical reasons are maxed out for both available current and breaker positions, and to add an additional load of 40% to 60% of current rating would easily exceed the service panel rating which would violate national and local electrical codes. To overcome this problem, it would be necessary to replace the existing service and service panel with higher capacity. This would be very expensive and, in the case of the multi-dwelling facility, practically impossible.

To overcome these problems, a solution is for the EVSE to share the power with an existing appliance, such as an electric stove, hot water heater or hot tub. In the case of the EVSE in close proximity to the electrical panel, the breaker for the appliance may also be shared with the EVSE, eliminating the need for an additional breaker. However, this is contrary to electrical codes, because when both devices call for power at the same time, the breaker would trip.

To prevent this problem and comply with electrical codes, it is advantageous to automatically switch the electrical power between the two loads, the appliance and the EVSE, so that they are not on at the same time. The automatic switching is a realistic and practical solution since concurrent usage of the appliance and the EVSE for significant time periods is ordinarily not required. The appliance, which is typically on for short periods of time, would have priority over the EVSE which is typically on for long time periods.

In addition to the maxed service panel for multi-dwelling residences is the fact that the service panel is not close to the area where the electric vehicle is parked, and it would be very expensive, if not impossible, to install a service line between the service panel and the EVSE. One solution would be to install an additional service meter and service panel to support the EVSE. The solution in addition to the added cost is also not desirable, for it would require the utility company to provide separate billing for the apartment and the EVSE.

To overcome this problem, one solution is for the EVSE to share the existing service line to the apartment service panel at a point close to the service meter—which is typically located in the garage near the electric vehicle. Electrical codes prevent adding a sub-panel to the service line without derating the existing service panel. In the case where the service panel is near or maxed out, this is typically not possible.

One solution to this problem is to add the sub-panel at the utility meter location, and to measure the total current being delivered to both the apartment via the service panel and to the electric vehicle via the power share and EVSE. When the total current (apartment and EVSE) approach the maximum rating of the service line, the power share reduces the current load on the service line by signaling the EVSE to either lower, stand by, or disconnect power to the electric vehicle. In any case, total current will not exceed service line rating, and therefore ensure compliance with electrical codes.

SUMMARY

Briefly stated, a power sharing system allocates power between an EVSE for charging an electric vehicle and an appliance, both of which are connected to a common power line. A power share module comprises a current sensor which senses current load on the appliance. A first signal is transmitted to the EVSE to allow full charging by the EVSE, when the current load is below a threshold. The second signal is transmitted to reduce the charging by the EVSE when the appliance load exceeds the threshold. The power share module continuously monitors the appliance load so that when the load decreases below the threshold, a third signal is transmitted to the EVSE to restore full charging by the EVSE.

A control contact command is transmitted to the EVSE. The power share module employs a relay for effecting a contact position between an open and a closed state. The power share module generates a control level signal to the EVSE in one embodiment. The power share module, in another embodiment, generates a signal to the EVSE for controlling an operational state of the EVSE which may be either an on/off state, a standby state or a pulse width modulation of a pilot signal.

A power sharing system for an EVSE connected via a breaker to a power line controls the power charging from the EVSE to an electric vehicle. A service line which supplies power to a remote residential unit is connected to the power line. The power share module comprises a current sensor which senses the current load on the service line. A first signal is transmitted to the EVSE to allow full charging by the EVSE when the current load on the service line is below a threshold. A second signal is transmitted to the EVSE to reduce charging by the EVSE when the service line current load is above the threshold. The current load is continuously monitored so that when the current load decreases below the threshold, a third signal is transmitted to the EVSE to restore full power charging by the EVSE.

A method of power sharing between a household utility and an EVSE for charging electric vehicles comprises connecting the utility and the EVSE to a single breaker unit of a panel. The utility current drawn by the utility is sensed. The EVSE charges an electric vehicle at full power when the utility current is below a threshold current. The charging power from the EVSE to the electric vehicle is reduced when the utility current exceeds the threshold current. The utility current is continuously monitored. Full power from the EVSE to the electric vehicle is restored when the utility current is below the threshold current.

A command control signal is transmitted to the EVSE. An on/off signal or a level control signal may be transmitted to the EVSE. The charging power to the electric vehicle may be reduced in proportion to the increase of the utility current above the threshold current until a peak load is reached.

A method of power sharing between an EVSE and a service line to a remote residential unit comprises connecting the service line and the EVSE to a common power line. The current drawn through the service line is sensed. The EVSE is used to charge the electric vehicle at full power when the service current is below a threshold current. The charging power from the EVSE to the electric vehicle is reduced when the service current exceeds the threshold current. The service line current is monitored. Full power from the EVSE to the electric vehicle is restored when the service line current decreases below the threshold current.

DETAILED DESCRIPTION

Figure 1:
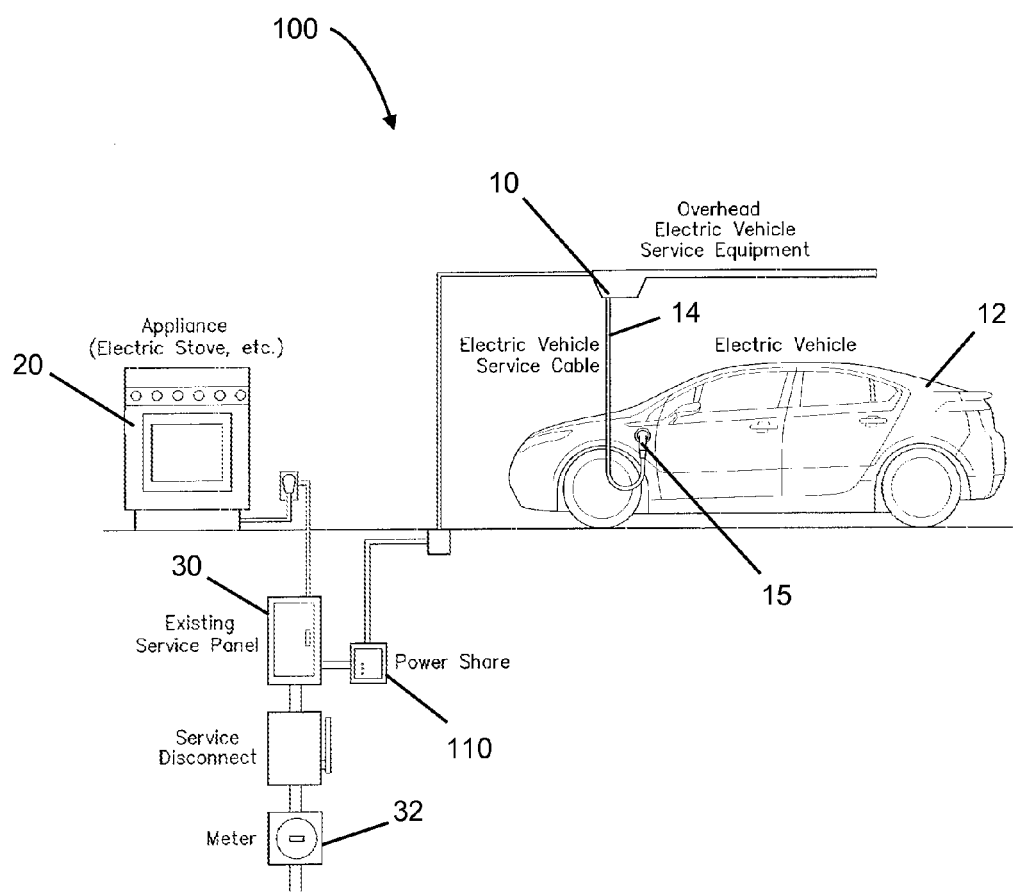
FIG. 1 is a plan diagram of a power share system, interfacing with an EVSE and electric vehicle and an appliance, for an appliance monitor embodiment.
Figure 2:
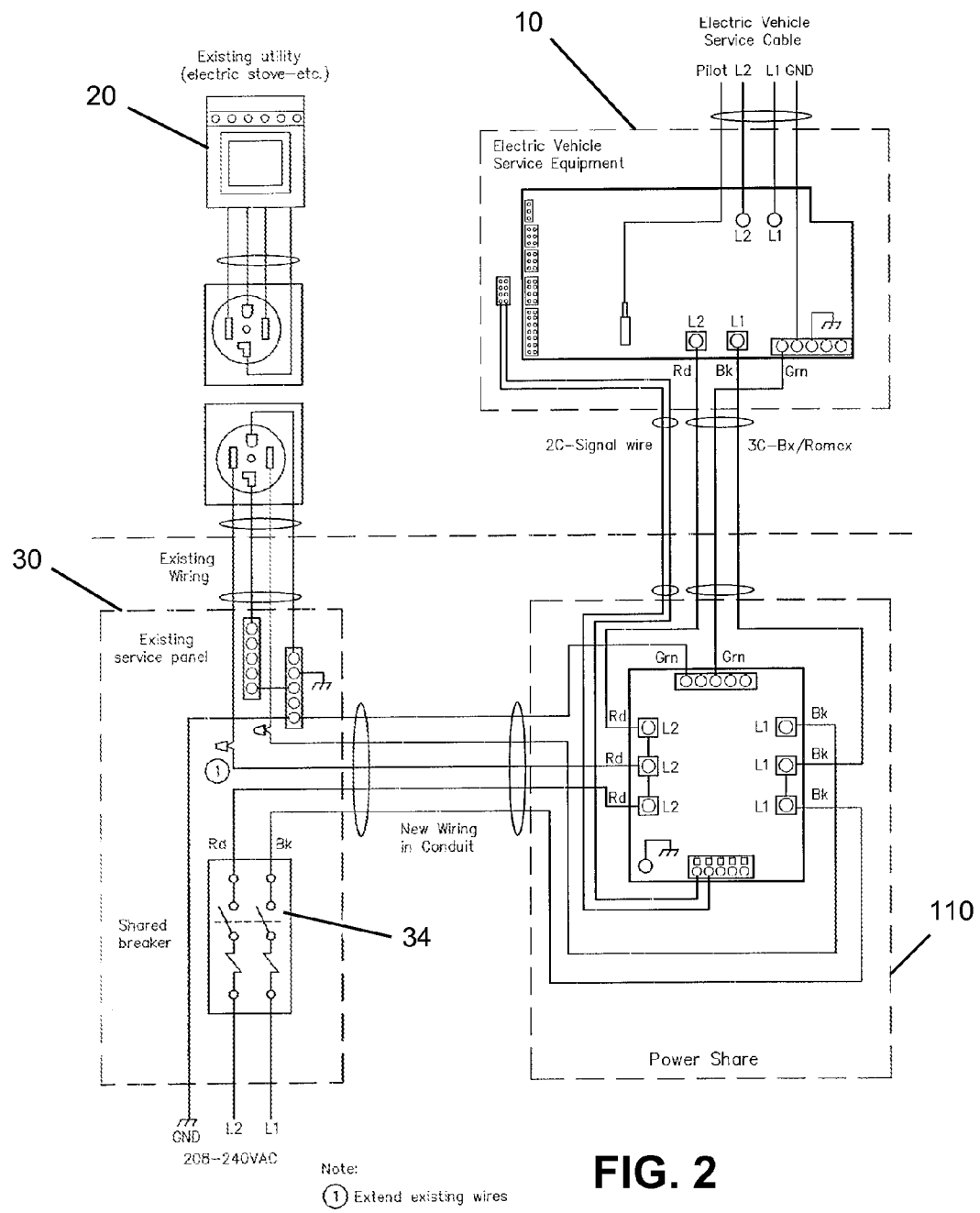
FIG. 2 is a wiring diagram for the power share system embodiment of FIG. 1.
Figure 3:
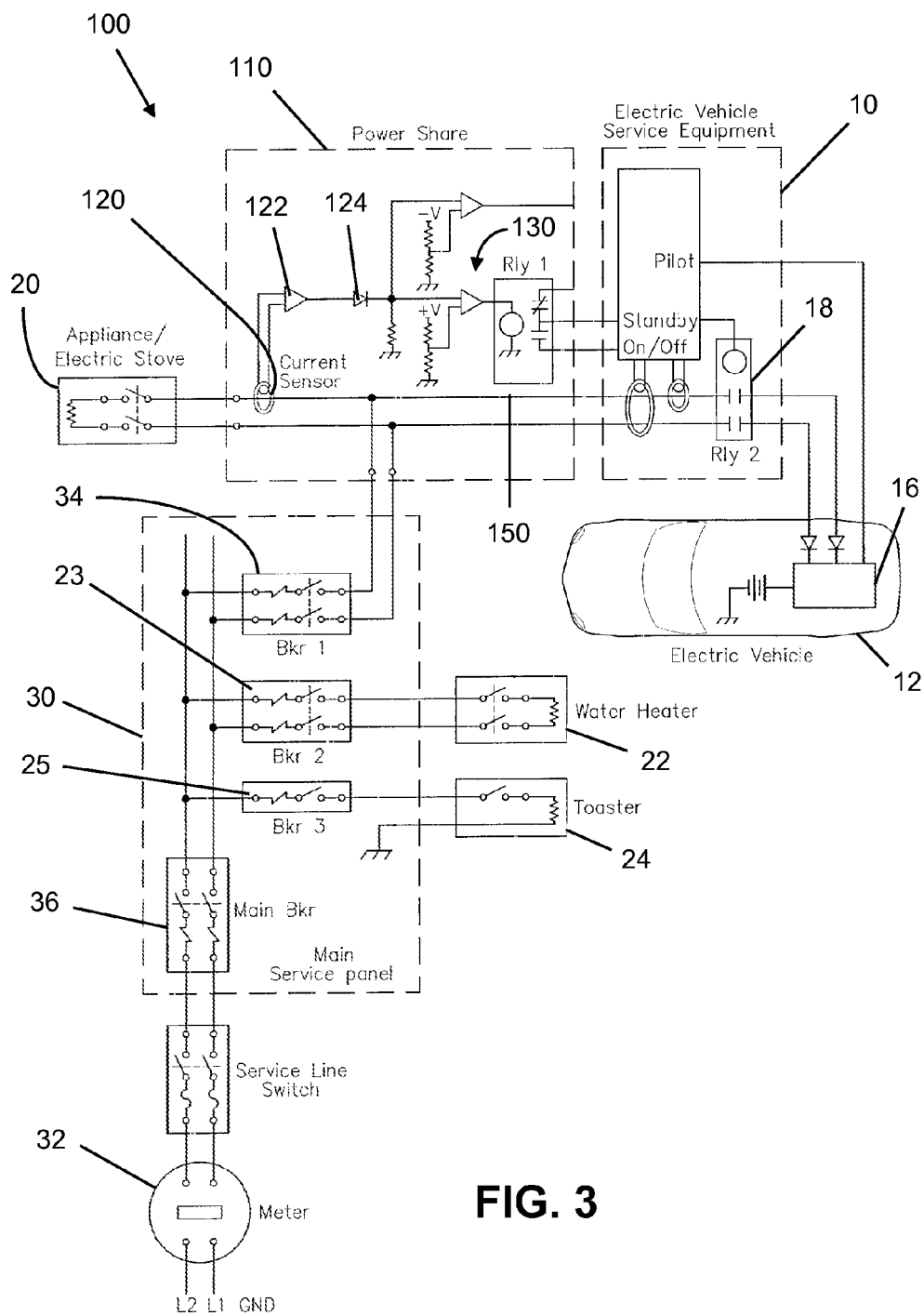
FIG. 3 is a block diagram of a power share system embodiment of FIG. 1 operating in a contact control mode.

With reference to the drawings wherein like numerals represent like parts throughout the Figures, a power share system designated generally by the numeral 100 in FIGS. 1 and 3 has particular applicability for a residential application, such as a single family residence. The power share system 100 functions to allocate power to a wide variety of EVSE 10 for charging the battery supply of an electric vehicle 12 without the necessity of installing additional service capacity to the existing residence.

Figure 14:
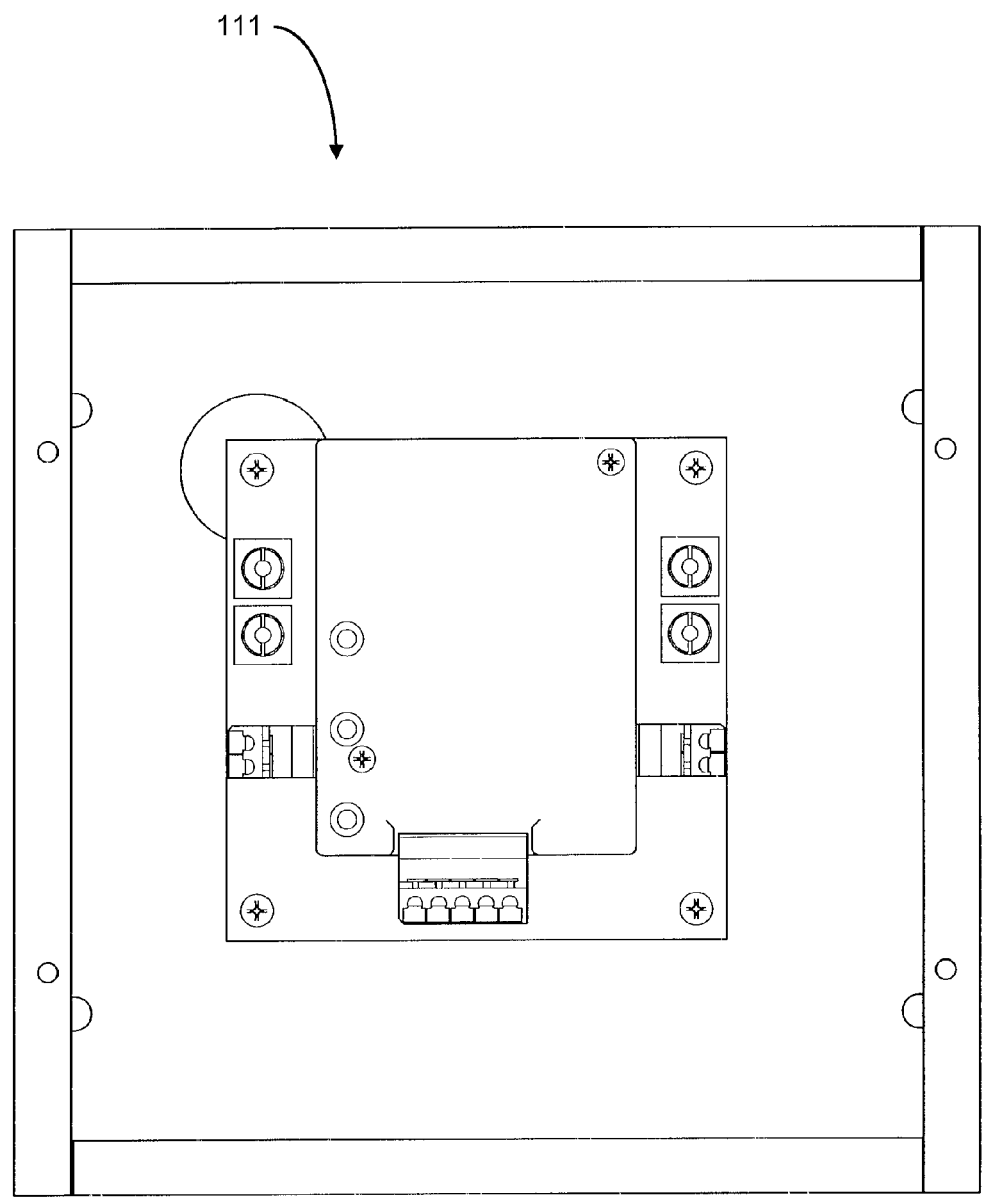
FIG. 14 is a front view, with the cover removed, of a power share module for the power share system of FIG. 1 monitor.
Figure 15:
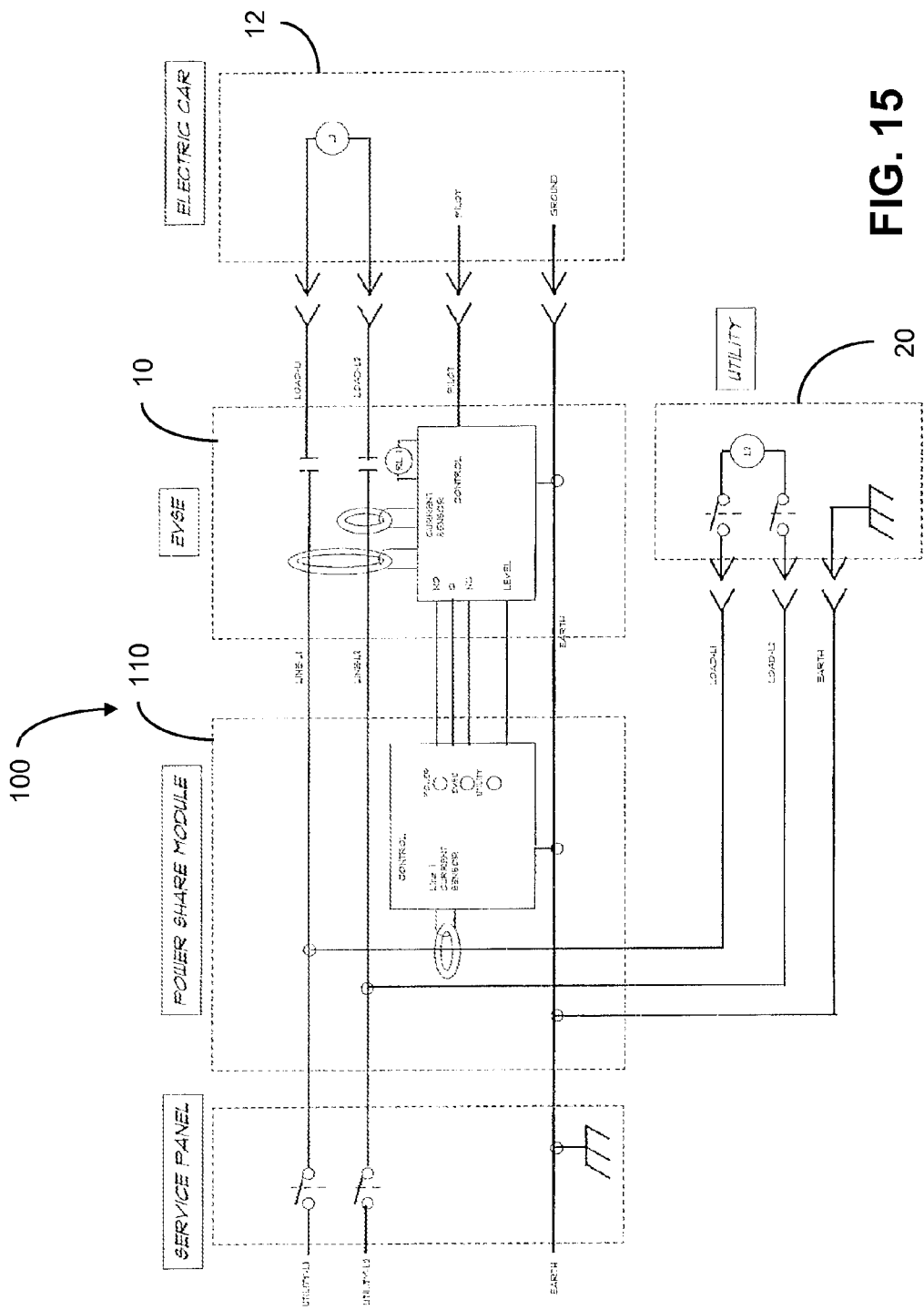
FIG. 15 is a block diagram for the power share system for the appliance monitor embodiment of FIG. 1.
Figure 16:
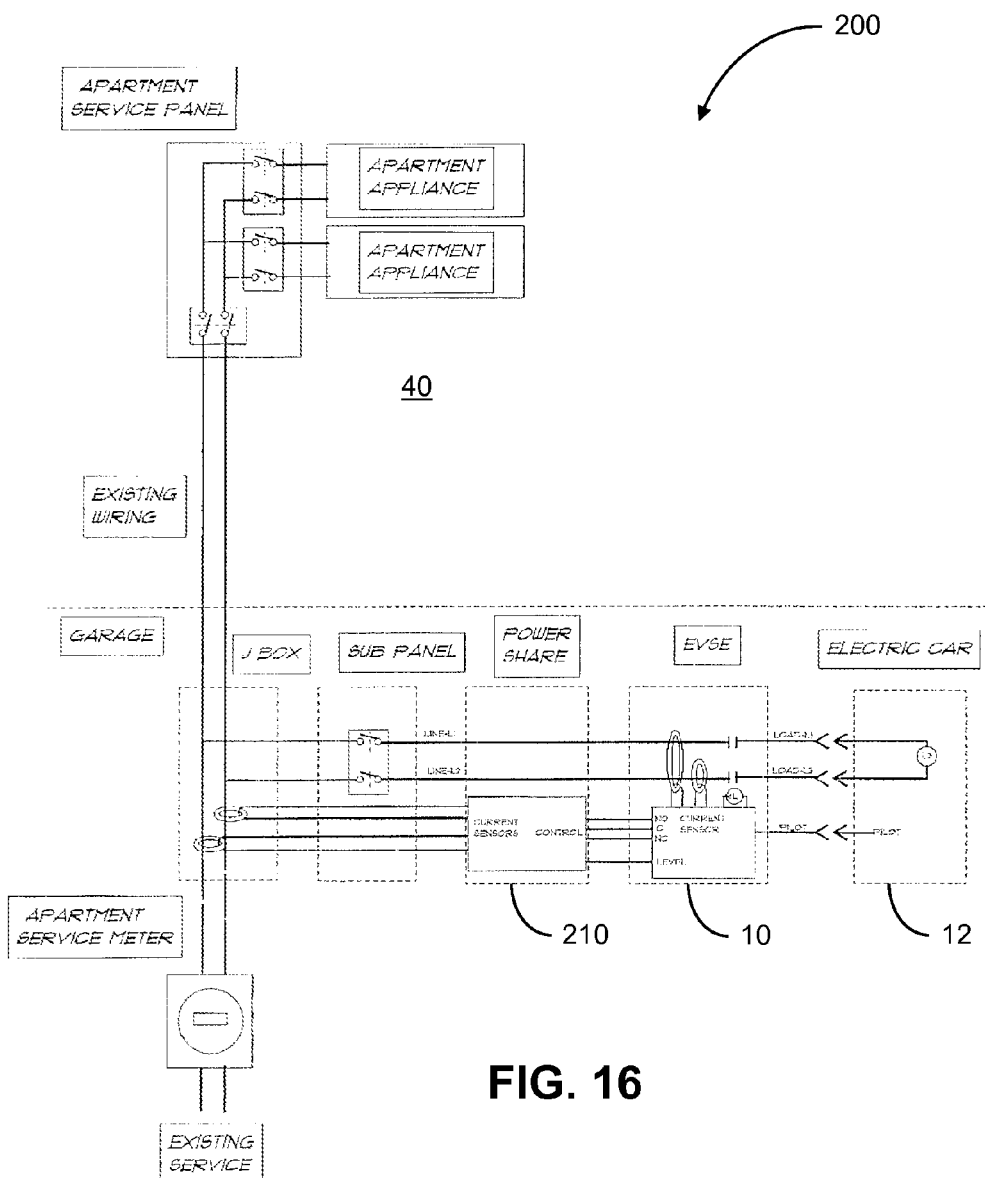
FIG. 16 is a block diagram of a service line monitor embodiment for the power share system of FIG. 7.

The key component is a power share module 110 which is easily installed at the residence. The power share module 110 is employed to sense the residential power load (or a principal load component) and to provide a signal to direct the charging power from an EVSE if there is sufficient power available. The EVSE for the application to which the power share system is adapted typically is rated for a peak load of 40 A (amperes) (32 A at 80% of maximum load). The power share module 110 may essentially be configured in the form of an electrical box 111 of FIG. 14. The electrical box 111 is easily installed and connected into the existing residential electrical system.

The power share module 110 in one embodiment is efficiently installed to interface with a single residential utility or appliance 20, which draws a significant load, such as, for example, an electric range or an electric clothes dryer. The appliance 20 connects with the existing service panel 30. The power share module 110 also connects with the existing service panel 30 of the residence. The service panel 30 receives power via an electric meter 32 and a shared breaker 34. The power share module 110 also connects directly with the EVSE 10 which is ultimately connectable typically by a cable 14 and J1772 connector 15 to the charging system 16 of the electric vehicle 12.

Figure 5:
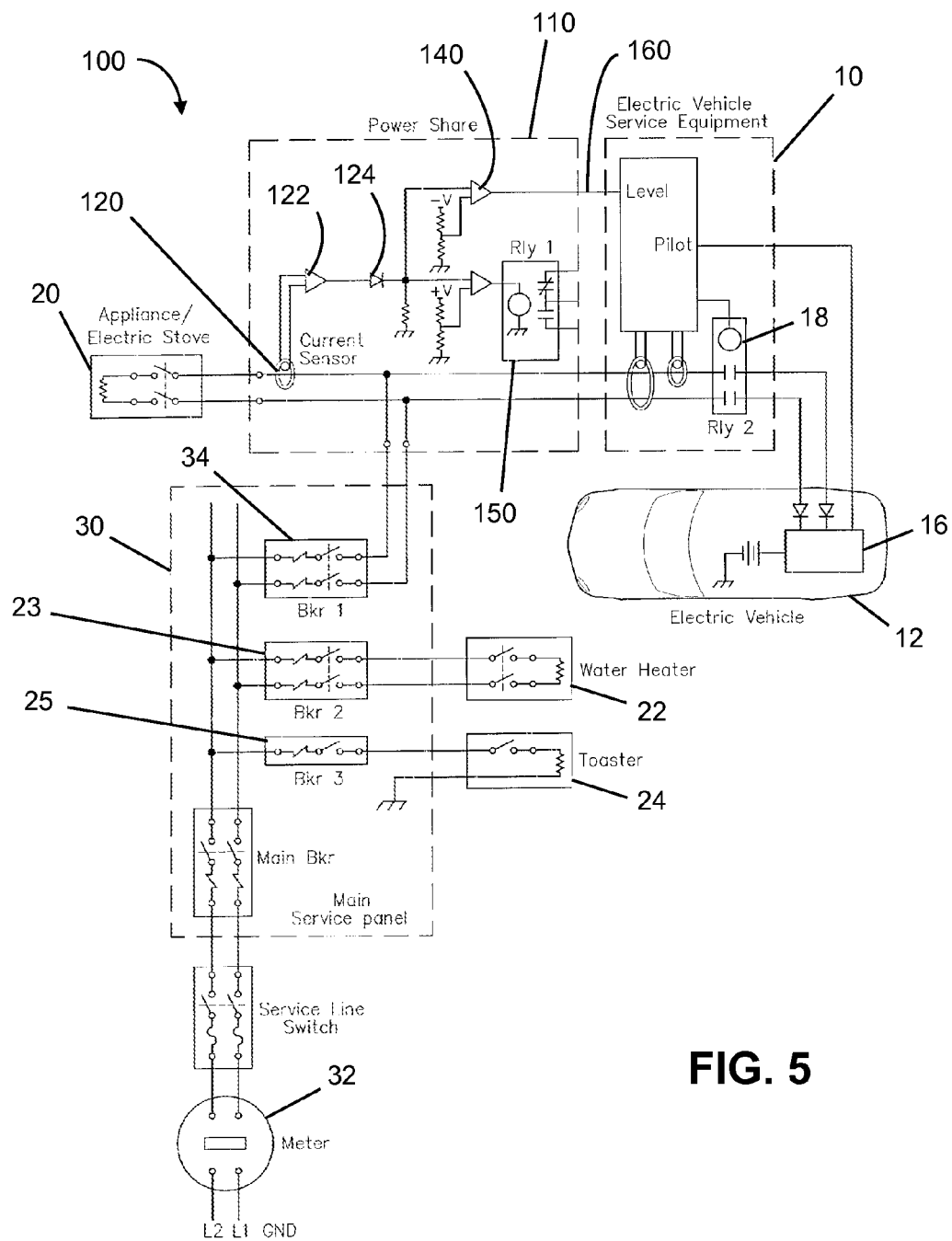
FIG. 5 is a block diagram for a power share system embodiment of FIG. 1 operating in a level control mode.

The power share module 110 functions as an appliance monitor and is configurable to operate in a contact control mode, such as illustrated in FIG. 3, or operates in a level control mode, such as illustrated in FIG. 5.

With reference to FIG. 3, the power share module 110 connects with the power lines L1, L2 via a breaker 36. Power lines L1, L2 also connect with the appliance 20, for example, electric range and with the power lines to EVSE 10. It will be appreciated that appliances which do not typically draw extremely large amounts of current, such as a hot water heater 22 and a toaster 24, connect through respective breakers 23, 25, which of course, also receive via power lines L1, L2.

The power share module 110 includes a current sensor 120 which connects with an amplifier 122 and a rectifier 124 to provide a direct current which is fed to a comparator 130. When the comparator 130 senses a voltage above a pre-established threshold, it generates a command signal to relay 150 which effects a contact closure. The contact closure functions to turn the EVSE "off", or to place the EVSE in a stand-by mode and/or to change the pilot signal to a small pulse width signal. The EVSE 10 includes a relay 18 which is responsive to the on/off or the stand-by to either reduce line charge across lines L1, L2 to the vehicle to zero or a low stand-by current.

Figure 4:
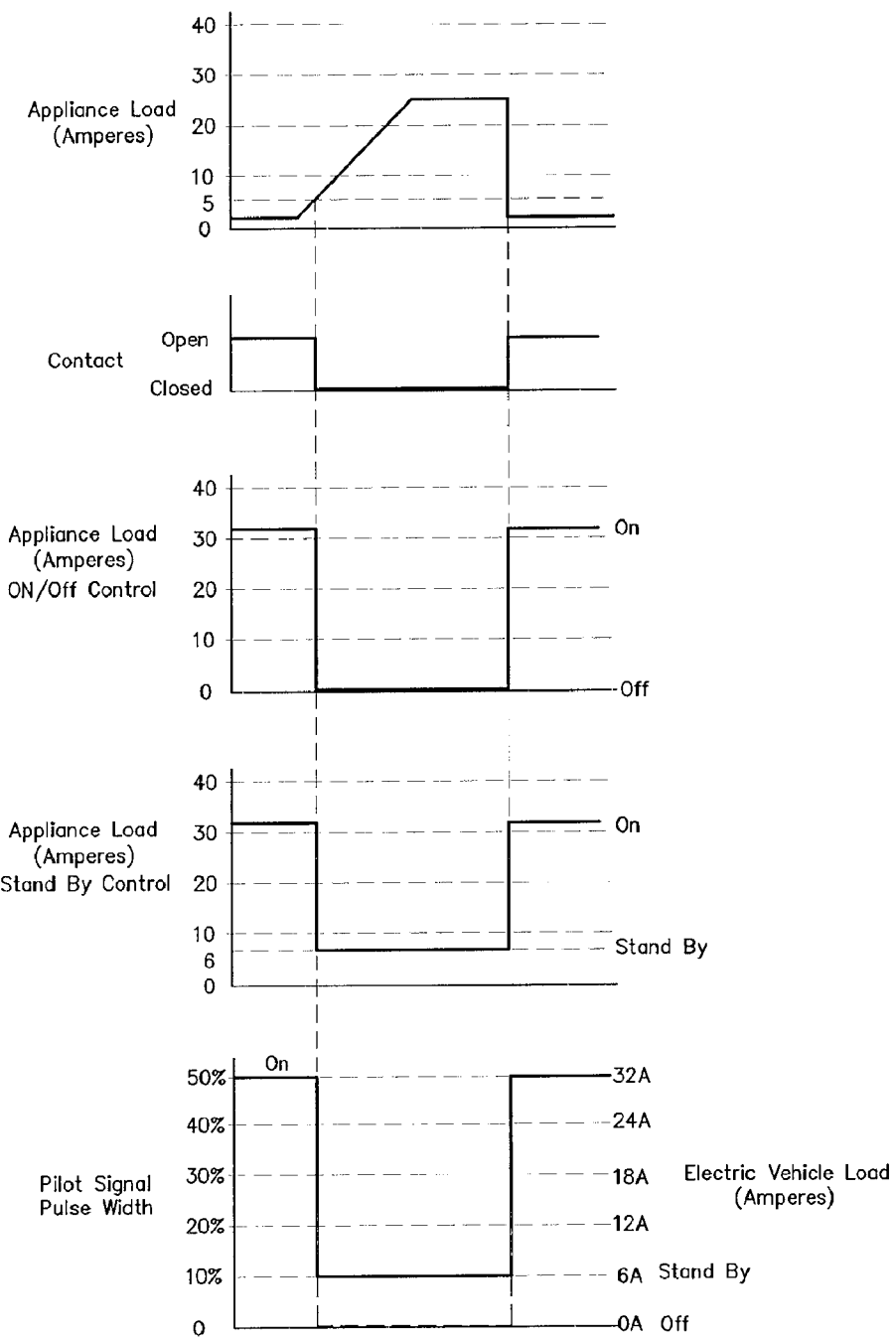
FIG. 4 is a composite timing diagram for the power share contact control embodiment of FIG. 3, illustrating a representative relationship between the appliance load, the contact state, the electric vehicle on/off control, electric vehicle standby control load and the pilot signal pulse width.

The timing relationship for the power share system is illustrated in FIG. 4. When the appliance 20 starts to draw current and increase the appliance load above a certain relative low threshold, such as 5 amps, as illustrated by the heavy line, the contact of the relay 150 is closed and the electric vehicle load goes off so that the load and amperes decreases to zero. The stand-by mode is typically 6 amps. The pilot signal pulse width typically goes to zero when the relay contact 150 is closed. It will be appreciated that when the appliance load decreases, for example, from 25 amps to below 5 amps, the relay 150 opens the contact and the resulting electric vehicle load increases to approximately 32 amps. The electric vehicle load for the stand-by control also ramps up to 32 amps and the pilot signal pulse width returns to 50% for the "on" condition.

With reference to FIG. 5 the power share module is also readily configurable to provide a voltage level output signal 160 to the EVSE 10. A comparator 140 generates a voltage output, when for example the voltage exceeds 4.6 volts. Thus the power share module generates a voltage level signal to the EVSE to allow the EVSE to commence charging and operate at a suitable voltage level. For this level mode, the charging by the EVSE may be accomplished by gradations as opposed to the on/off condition typically produced by the contact closure.

Figure 6:
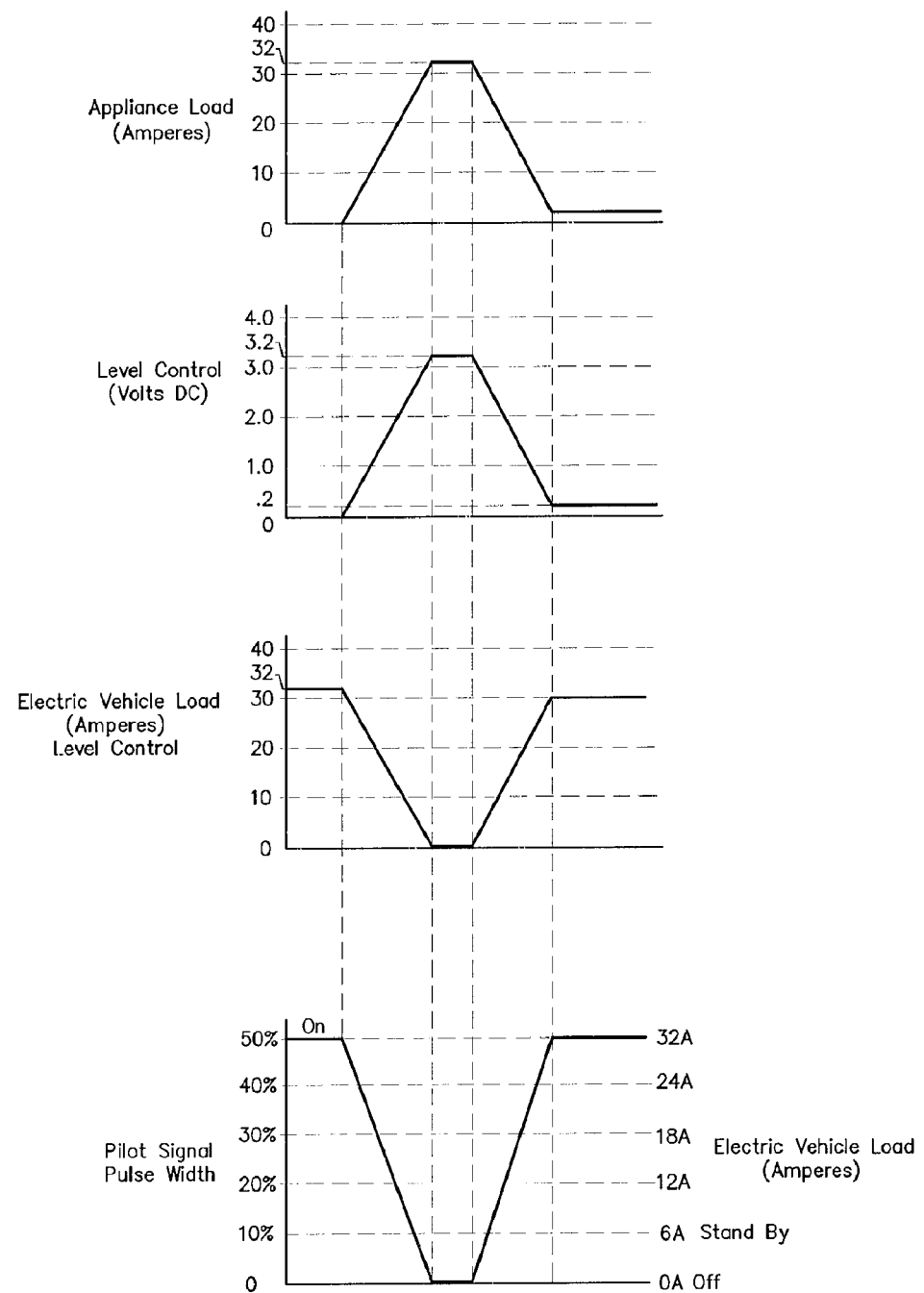
FIG. 6 is a composite timing diagram for the power share system level control embodiment of FIG. 5 illustrating a representative relationship between the appliance load, the electric vehicle level control (volts), the electric vehicle level control (amperes) and the pilot signal pulse width.
Figure 7:
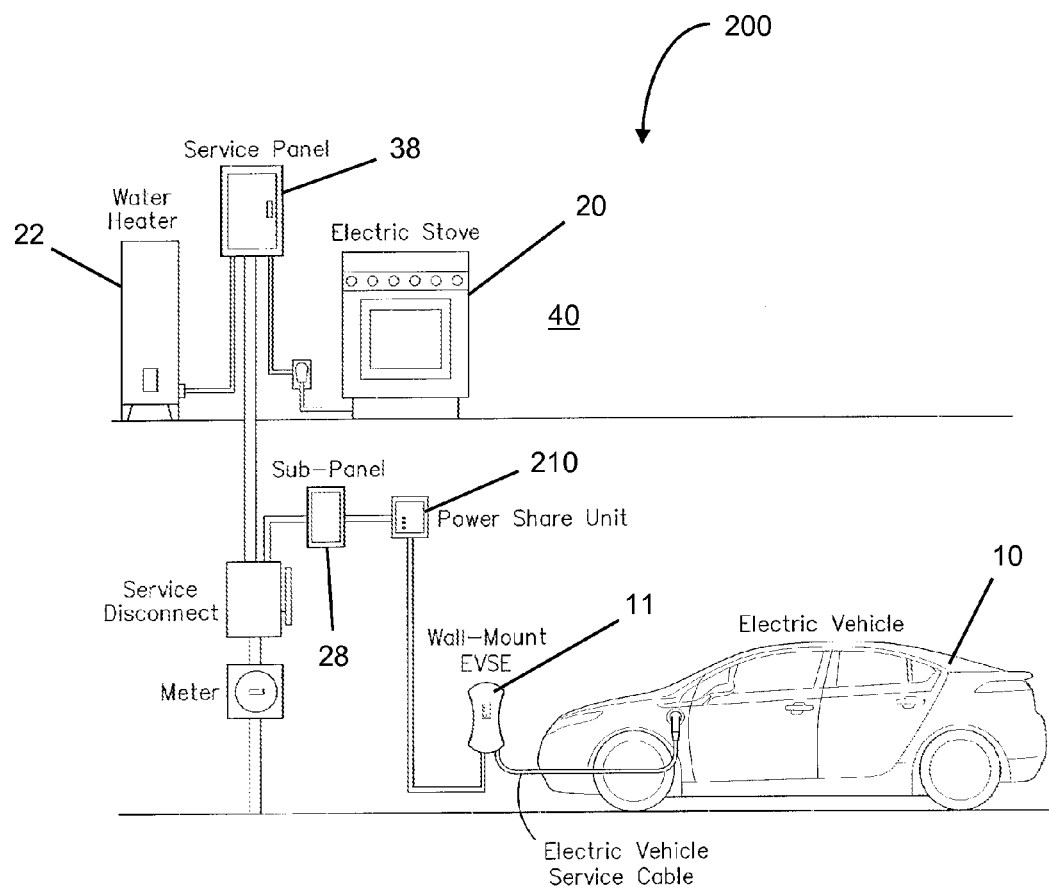
FIG. 7 is a plan diagram for a power share system interfacing with an EVSE and electric vehicle and a service line to a residential unit for a service line monitor embodiment.
Figure 8:
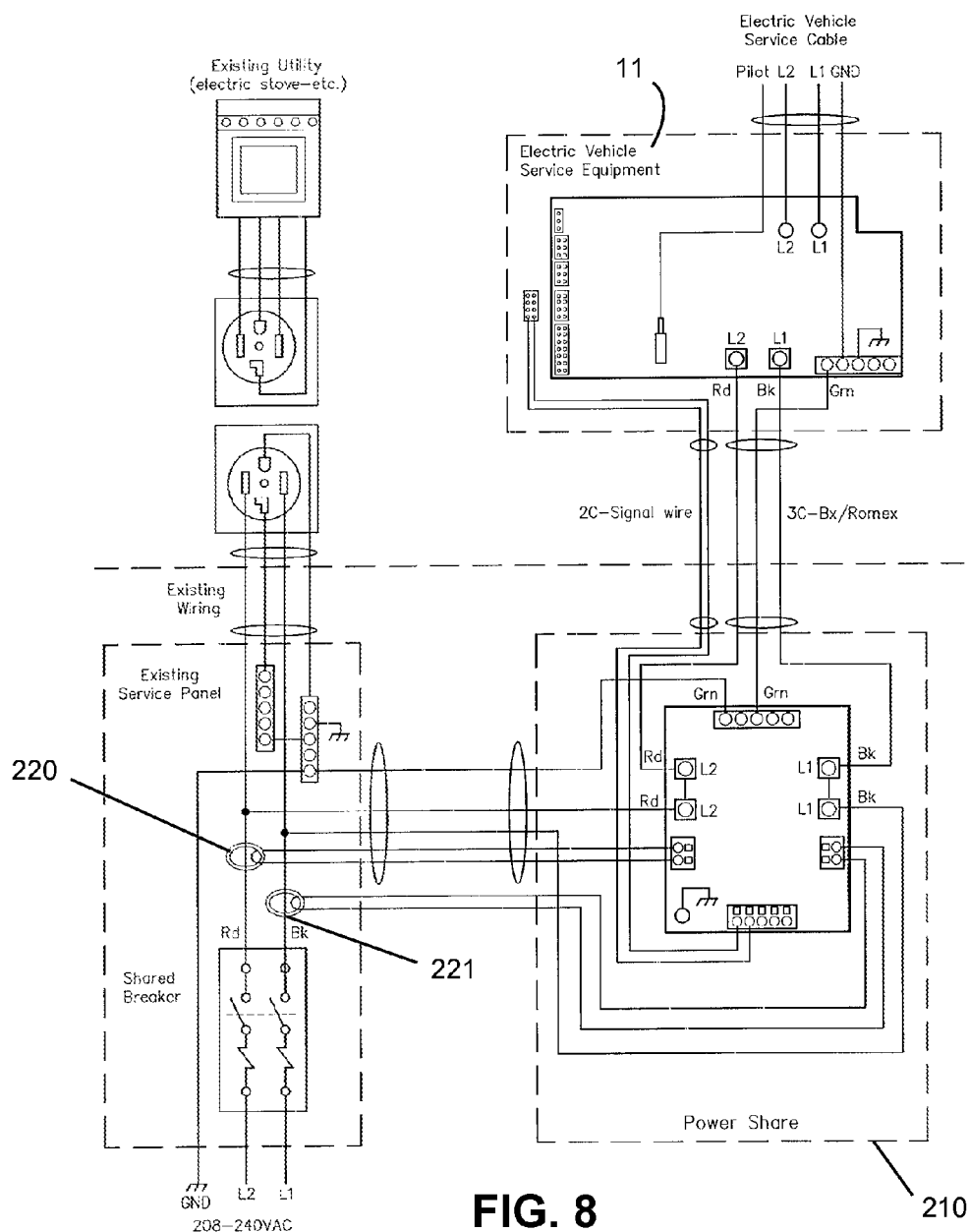
FIG. 8 is a wiring diagram for the power share system embodiment of FIG. 7.

With reference to FIG. 6, a power share timing diagram is illustrated for the level control operation of the appliance monitor power share module 110. As the appliance load current ramps up from zero to, for example, 32 amps, the level control increases from zero to approximately 3.2 volts. The electric vehicle load (in amperes) correspondingly starts a proportional decrease in a gradual manner towards zero until the peak appliance load is reached. The pilot signal also decreases from a 50% pulse width at "on" to a zero pulse width modulation at "off". As the appliance load remains steady, for example, at 32 amps, the electric vehicle load in amps remains at zero. When the appliance load decreases to approximately zero, it will be appreciated that the level control (in volts) also correspondingly, proportionately declines to 0.2 volts, the electric load (in amperes) proportionately increases to approximately 32 volts, and the pilot signal pulse width is restored to the 50% pulse width at the full "on" position at 32 amps.

Figure 13:
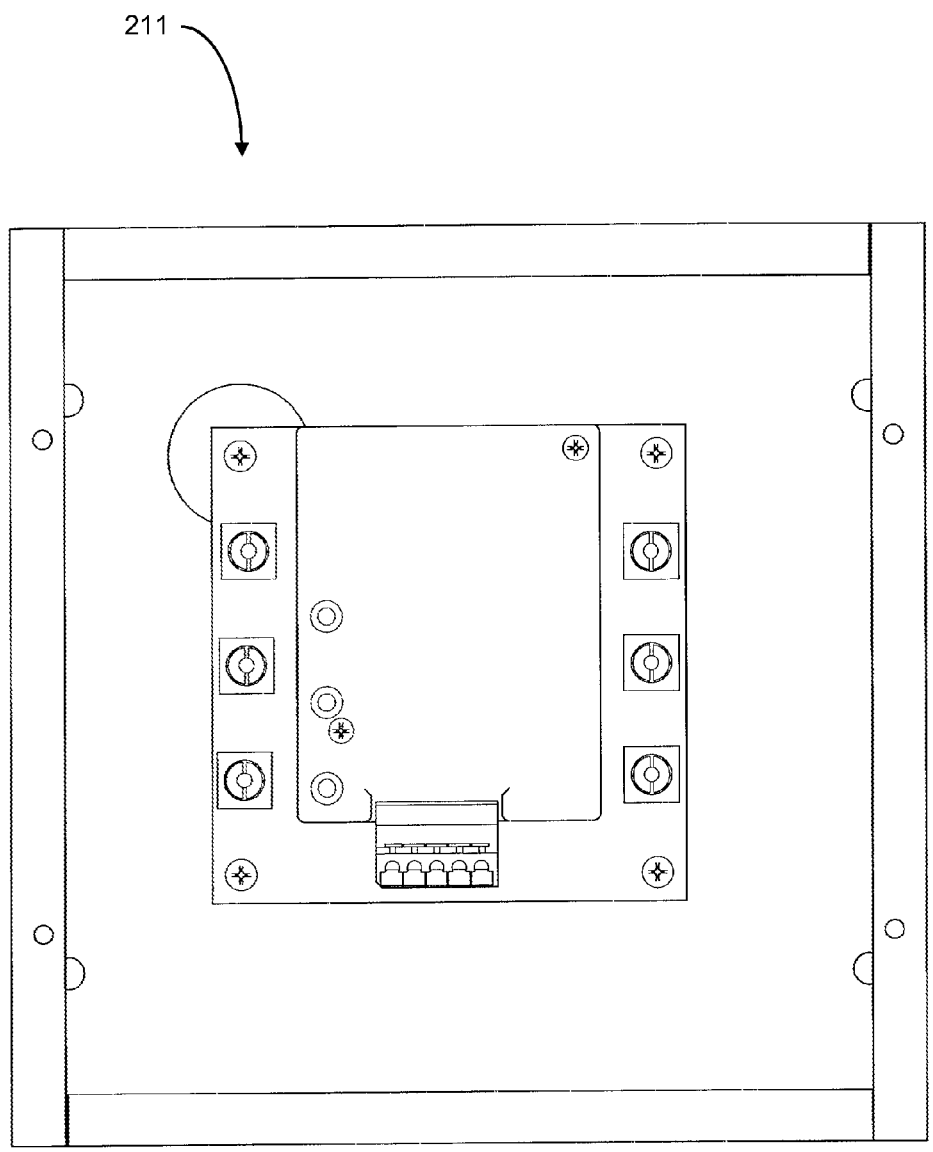
FIG. 13 is front view of a power share module, with the cover removed, for the power share system of FIG. 7.

With reference to FIGS. 7-11, power share system 200 allocates electric power for an EVSE, such as a wall mounted EVSE 11, for charging an electric vehicle 10. Power share system 200 has particular applicability for multi-unit dwellings, such as apartments, condominiums and other multi-unit facilities where the electric vehicle 10 is typically parked a significant distance from the dwelling unit adjacent the EVSE. The power share system 200 employs a power share module 210 which again is configured in an electrical box 211, such as illustrated in FIG. 13. The power share module 210 connects with a sub-panel 28 via a breaker 29 and with the main breaker 39 of the main service panel 38 of the service line to the residential unit 40.

The power share module 210 monitors the current load of the service line. By contrast, power share module 110 essentially monitors the power to a major appliance and not the power to the entire residence. In this embodiment, the power share module, in effect, monitors the current to each of the appliances and power devices of the unit, such as an electric stove 20, a hot water heater 22 and various other devices 24. The power share module 210 is also configurable for operation in a contact mode, such as illustrated in FIG. 9, or a voltage level mode, such as illustrated in FIG. 11.

Figure 9:
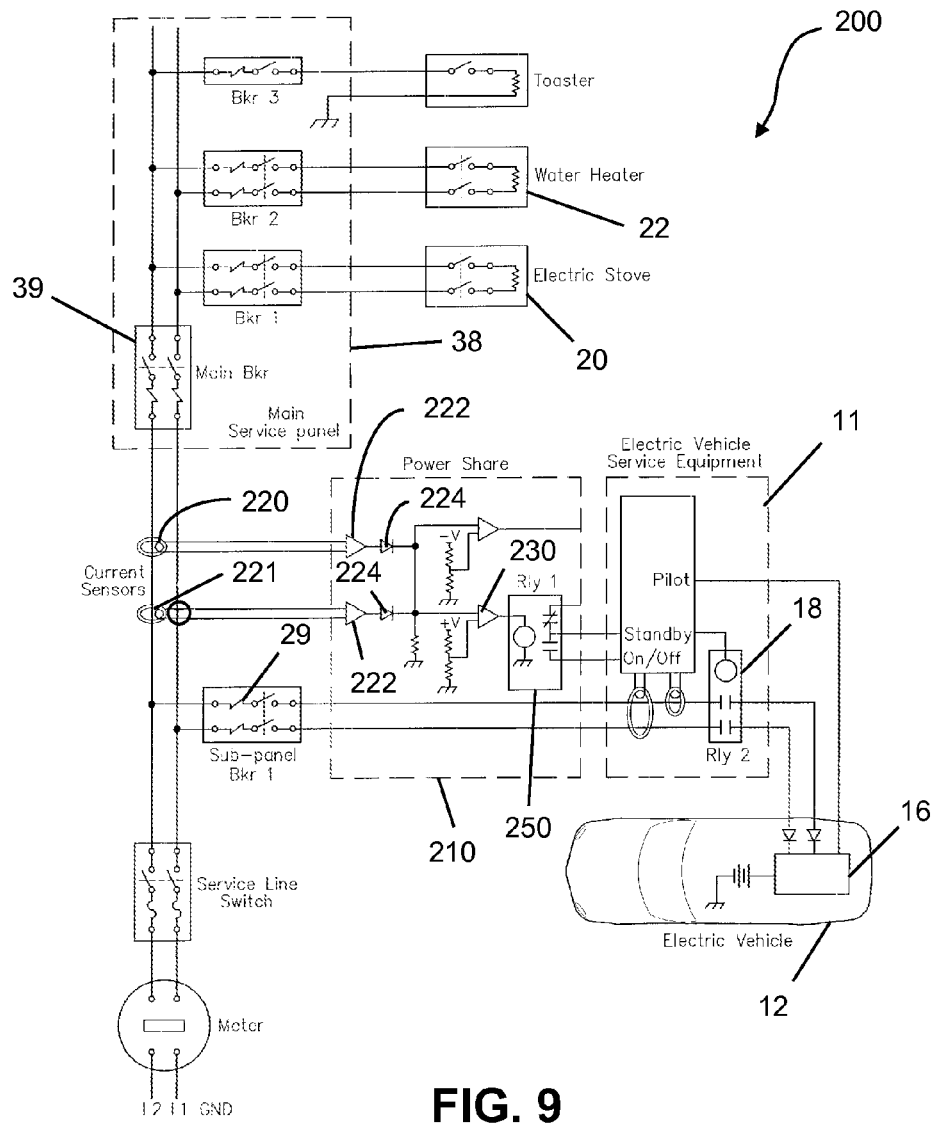
FIG. 9 is a block diagram of a power share system embodiment of FIG. 7 operating in a contact control mode.

With reference to FIG. 9, the service line to the unit connects via a sub-panel 28 via a breaker 29 with the EVSE 11 which connects for charging the electric vehicle 10. Current sensors 220, 221 across the power lines L1, L2 to the main service panel and main breaker of the unit communicate via an amplifier 222 and a rectifier 224 of the power share module 210. A voltage comparator 230 controls a relay 250. The relay 250 controls the on/off contact of the EVSE unit which, in turn, controls the relay 18 for providing communication between the power lines L1, L2 and the electric vehicle. The relay may also control the state of the standby voltage and the pulse width of the pilot line.

Figure 10:
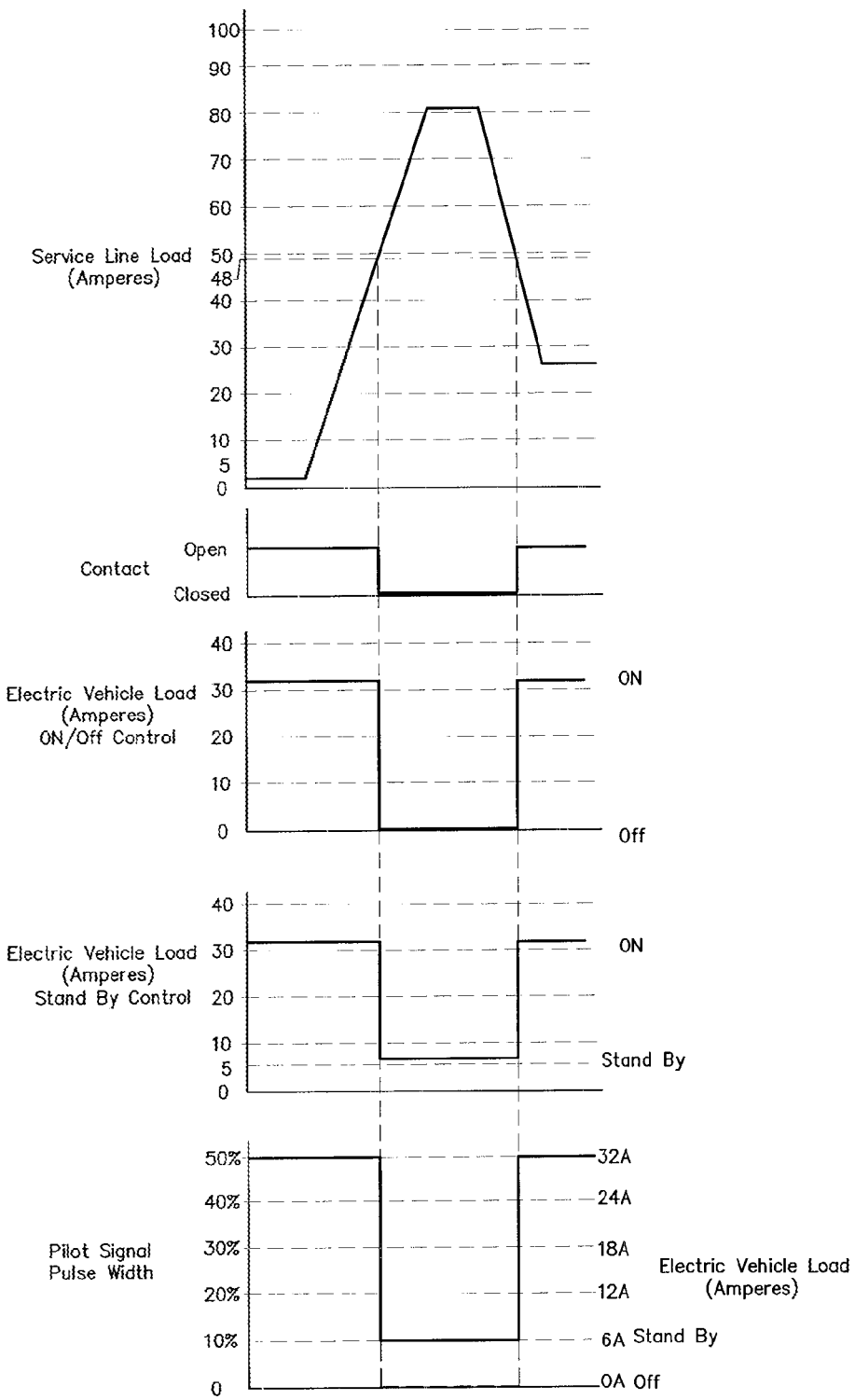
FIG. 10 is a composite timing diagram for the power share system contact control of FIG. 9, illustrating a representative relationship between the service line load, the contact state, the electric vehicle on/off control load, the electric vehicle standby control load, and the pilot signal pulse width.

With reference to FIG. 10, a timing diagram for the power share service line monitor module is illustrated. The service line load (in amperes) for a service line, rated at 100 amps, would typically peak at 80 amps. As the service line load increases toward 80 amps at approximately 48 amps, the contact is closed and the electric vehicle load goes "off" and descends to zero. As the service line load increases to the maximum, the electric vehicle load will remain at zero. The electric vehicle load, for the standby control, will decrease to 6 amps. As the service line load decreases to below, for example, 48 amps, the contact opens and the electric vehicle load will increase, and the EVSE 11 will resume charging the electric vehicle 12.

Figure 11:
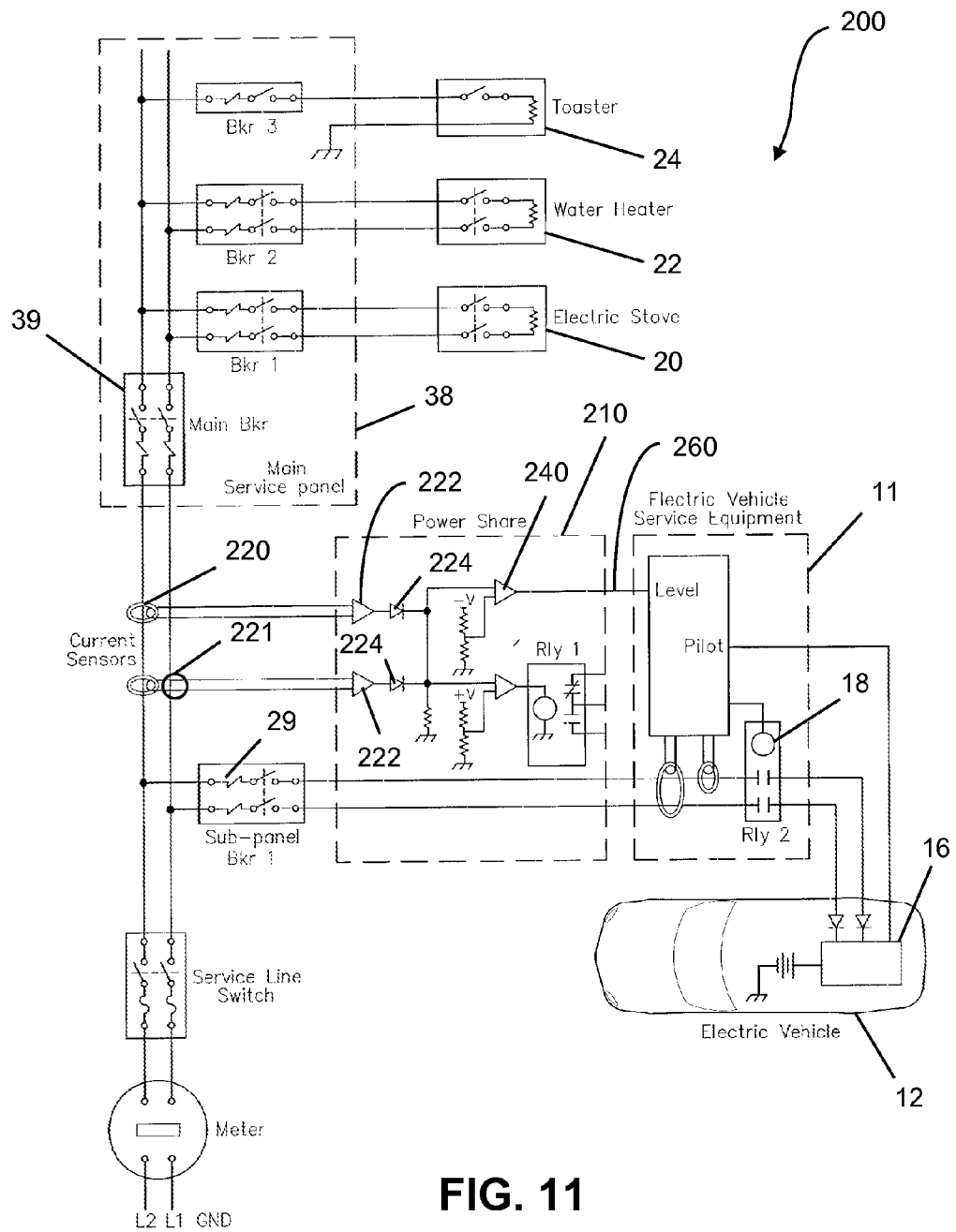
FIG. 11 is a diagram for a power share system of FIG. 7 operating in a level control mode.

With reference to FIG. 11, a power share module 210 of the service line monitoring type, which is operational in the level control mode, is illustrated. When the comparator 240, for example, reaches +4.8V, a level control signal 260 is generated to the EVSE level control for allowing the power to the electric vehicle via the relay 18 of the EVSE.

Figure 12:
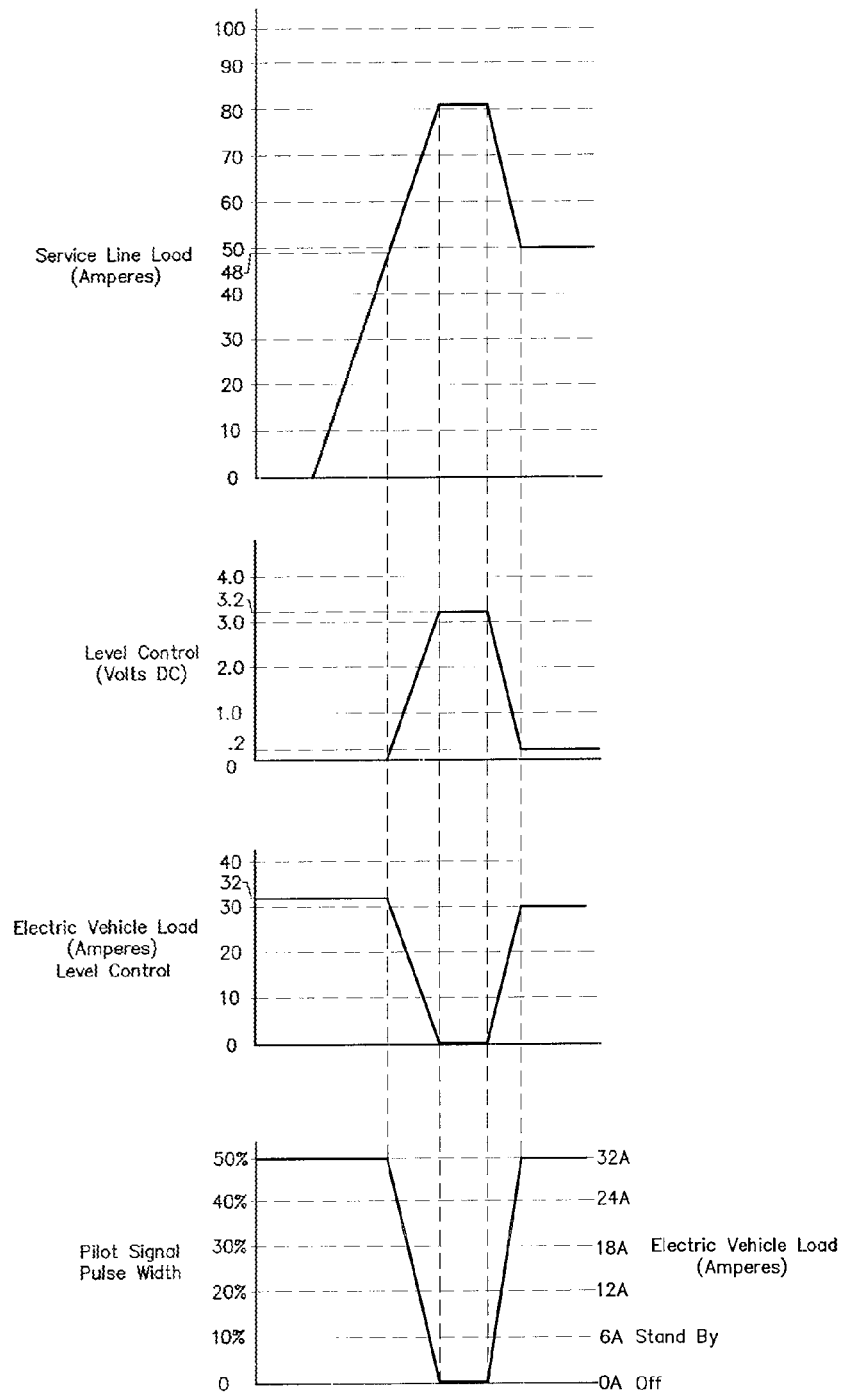
FIG. 12 is a timing diagram for the power share system level control of FIG. 11 illustrating the representative relationship of the service line load, the level control (volts), the electric vehicle level control load (amperes), and the pilot signal pulse width.

The power share timing diagram for the FIG. 11 operational mode is illustrated in FIG. 12. The level control (in volts) remains at approximately 0.2 until the service line load in amperes exceeds approximately 48 amps. As the level control increases to the 80 amp maximum, the electric vehicle load (in amperes) gradually decreases from 32 amps to 0 amps in proportion to the service line load increase and remains at 0 amps while the service line load is at maximum. The electric vehicle load then increases toward 30 amps when the service line load decreases to approximately 48 amps.

Figure 17:
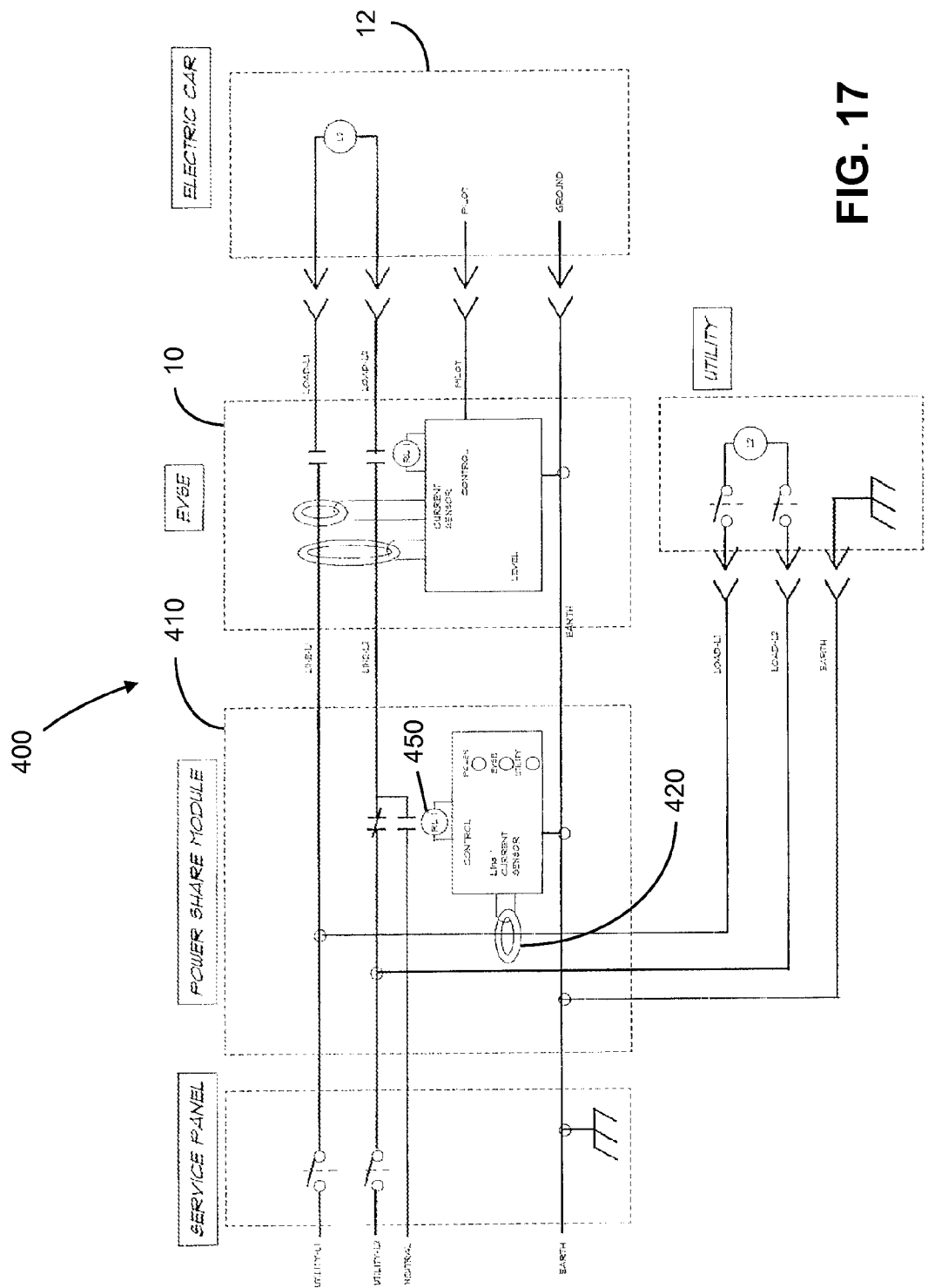
FIG. 17 is a block diagram for another power share system embodiment.

A generalized wiring diagram for the power sharing system 400 illustrated in FIG. 17 indicates the line connections with the power share module 410. A neutral line is employed. The line L2 is controlled by the relay 450 which is responsive to the current sensor 420 on line L1. When the current load of the utility is below a threshold (for a pre-established time interval), the lines L1, L2 connect to supply power to the EVSE 10. In the event that the line L1 exceeds the threshold, the relay 450 acts to step down the power by connecting across line L2 and the neutral line.

Figure 18:
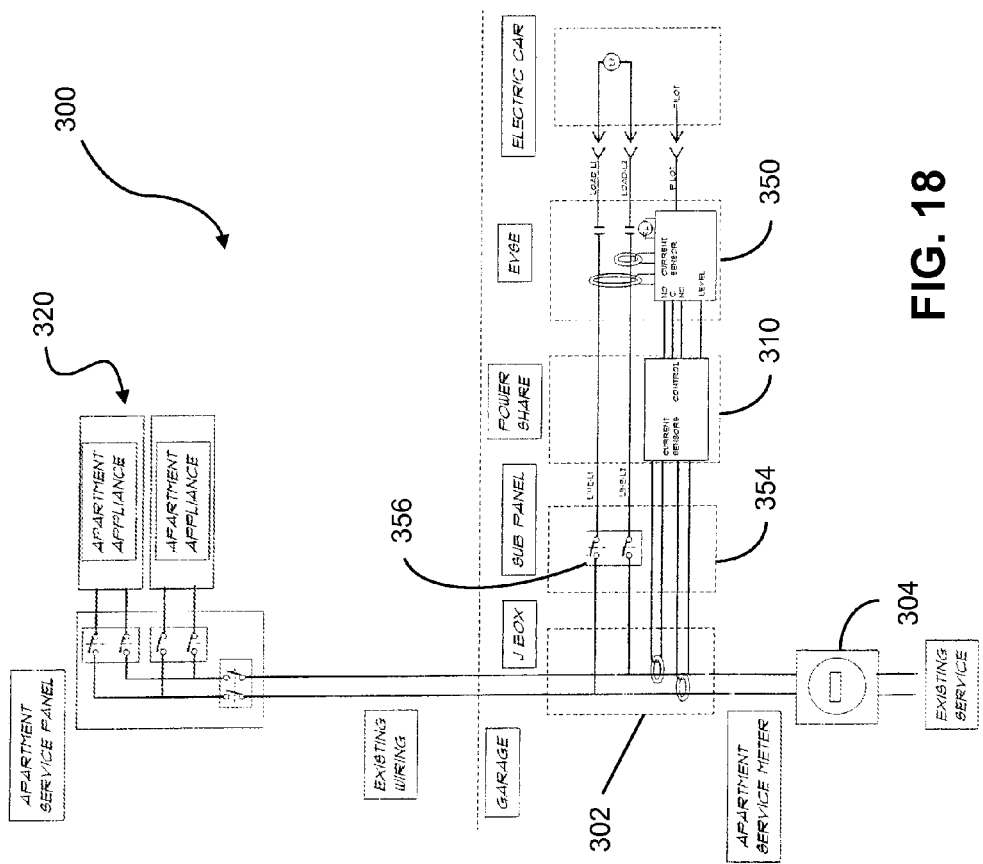
FIG. 18 is a power share system employed for a representative multi dwelling residence and adapted to supply power to EVSE for charging an electric vehicle.
Figure 19:
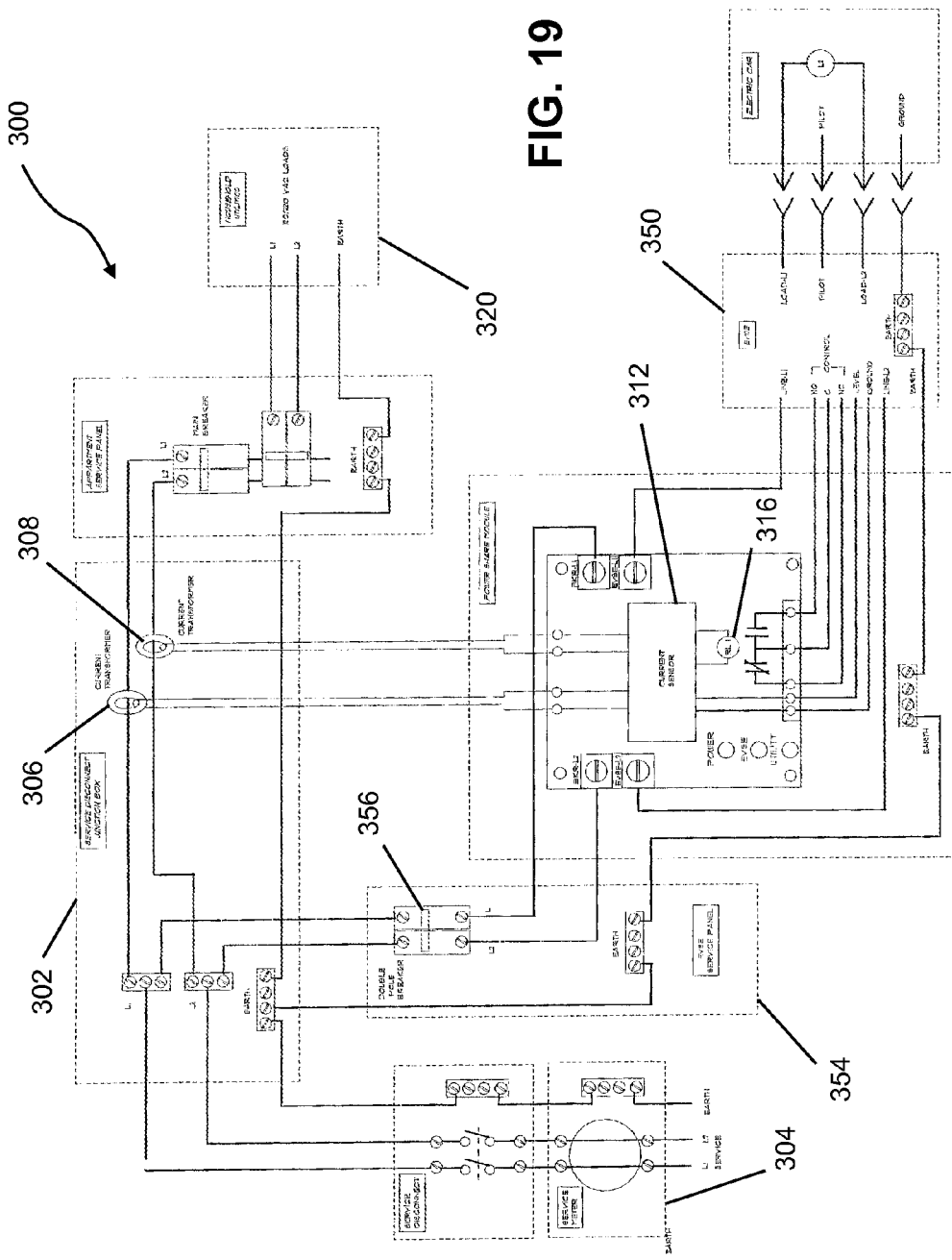
FIG. 19 is a block wiring diagram for the power share system of FIG. 18.
Figure 20:
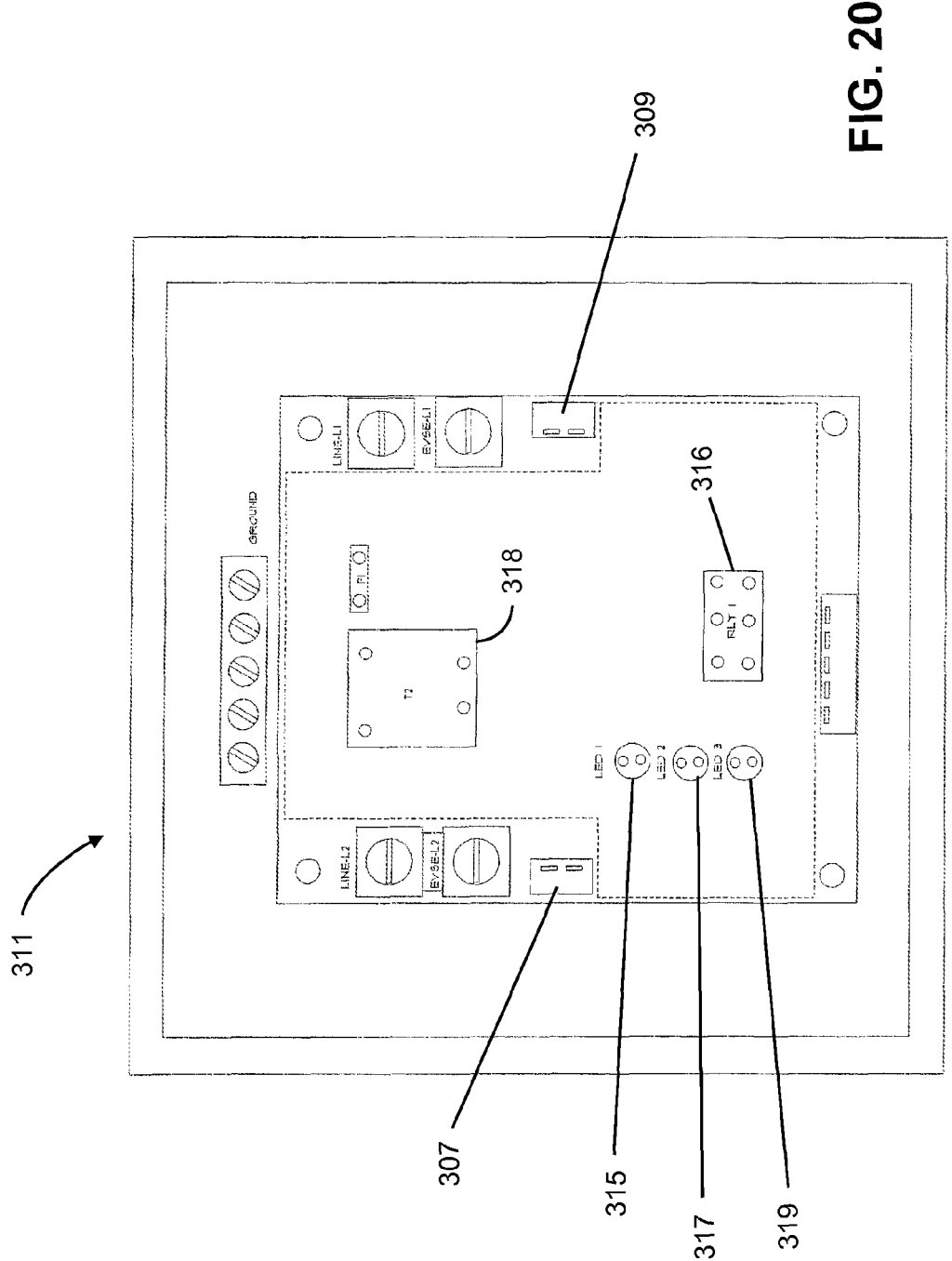
FIG. 20 is a front interior view, portions removed, of a power share module for the power share system of FIG. 18 and annotated to show connection terminals.

A power share system 300 for a multi-dwelling application, such as for an apartment building or condominium, is illustrated in FIGS. 18-20. A junction box 302 downstream from the dwelling unit service meter 304 houses a pair of line sensor transformers 306 and 308 which continuously sense the current load in lines L1 and L2.

The power share module 310 includes a control board 314 with a current sensor 316 which receives inputs from transformers 306 and 308 that continuously measure the current for both lines L1 and L2. In power share system 300, multiple appliance loads are measured for the utilities 320.

The power share module 310 includes a microprocessor 318 which controls a relay 316 to generate a control signal to the EVSE. A closure control command is then sent to the EVSE as well as a current level. Signal pulse width modulation is employed to determine the current level available for EVSE so that the EVSE can determine the available power. A pulse rate differential is employed to generate the level control signal. If the utilities 320 are drawing power above a threshold level, the EVSE control will not allow the EVSE to draw significant power. There may be a power level when the EVSE can draw sufficient power at a reduced level to provide a low level charge to the electric vehicle.

A wiring diagram for the power share system 300 illustrated in FIG. 19, which is essentially for a unit of a multi-dwelling facility, indicates the various line connections. The circuit panel for the power sharing system 300 illustrated in FIG. 20 shows how the various lines connect with the module. The current sense transformers 306 and 308 connect via sockets 307 and 309.

The power share module 310 is preferably configured as an electrical box 311 mounted in the garage adjacent the EVSE 350. The junction box 302 and an EVSE breaker sub-panel 354 with a double pole breaker 356 are also installed in the garage and connected downstream from the apartment service meter 304. The module includes LEDs 315, 317 and 319 for indicating the allocation of the dwelling unit power supply.

Any of the power sharing modules may incorporate an eco-module which regulates the supply of power to the EVSE to favor certain low cost energy times of the day and prevent the supply of power when the energy cost is highest at peak demand times of the day.

In addition the EVSE may generate a signal when charging is complete. The signal may be transmitted to the dwelling unit to advise that charging is complete.

The invention claimed is:

1. A power sharing system comprising:
a power line;
a service panel connected to said power line;
an EVSE connected to said power line via said service panel;
a household appliance connected to said power line via said service panel;
a power share module having a box-like housing and communicating with said service panel and said EVSE comprising a current sensor which senses current load on said appliance and transmits a first signal to said EVSE to allow full charging by the EVSE when the current load is below a threshold, and transmits a second signal to reduce the charging by the EVSE when the appliance load exceeds the threshold and which continuously monitors the appliance load so that when the load decreases below the threshold, a third signal is transmitted to the EVSE to restore full charging by the EVSE.

2. The power sharing system of claim 1 wherein a control contact command is transmitted to the EVSE.

3. The power sharing system of claim 1 wherein the power share module employs a relay for effecting a contact position between an open and a closed state.

4. The power sharing system of claim 1 wherein said power share module generates a control level signal to the EVSE.

5. The power sharing system of claim 1 wherein the power share module generates a signal to the EVSE for controlling an operational state selected from the group consisting of an on/off state, a standby state and the pulse width modulation of a pilot signal.

6. A power sharing system comprising:
a power line;
a service panel connected to said power line;
an EVSE connected via said service panel to said power line;
a service line which supplies power to a remote residential unit and is connected to said power line via said service panel;
a power share module having a box-like housing and connected to said service panel comprising a current sensor which senses the current load on said service line and transmits a first signal to said EVSE to allow full charging by said EVSE when the current load is below a threshold, and transmits a second signal to reduce charging by the EVSE when said current load is above the threshold, and continuously monitors the current load so that when said current load decreases below the threshold, a third signal is transmitted to said EVSE to restore full power charging by the EVSE.

7. The power sharing system of claim 6 wherein a control contact command is transmitted to the EVSE.

8. The power sharing system of claim 6 wherein the power share module employs a relay for effecting a contact position between an open and a closed state.

9. The power sharing system of claim 6 wherein said power share module generates a control level signal to the EVSE.

10. The power sharing system of claim 6 wherein the power share module generates a signal to the EVSE for controlling an operational state selected from the group consisting of an on/off state, a standby state and the pulse width modulation of a pilot signal.

11. A method of power sharing between a household utility and an EVSE comprising:
connecting the utility and the EVSE to a single breaker unit of a panel;
connecting a control module for communication with said service panel and said EVSE;
sensing the utility current drawn by the utility with said control module;
employing the EVSE to charge an electric vehicle at full power when the utility current is below a threshold current;
reducing the charging power from the EVSE to the electric vehicle when the utility current exceeds the threshold current;
continually monitoring the utility current with said control module; and
restoring full power from the EVSE to the electric vehicle when the utility current is below the threshold current.

12. The method of claim 11 further comprising transmitting a command control signal to the EVSE.

13. The method of claim 11 further comprising transmitting an on/off signal to the EVSE.

14. The method of claim 11 further comprising transmitting a level control signal to the EVSE.

15. The method of claim 11 further comprising reducing the charging power to the electric vehicle in proportion to the increase of the utility current load above the threshold current until a peak load is reached.

16. A method of power sharing between an EVSE and a service line to a remote residential unit comprising:
- connecting the service line and the EVSE to a power line via a service panel;
- connecting a control module for communication with said service panel and said EVSE;
- sensing current drawn through the service line with said control module;
- transmitting a signal from the control module to the EVSE to charge an electric vehicle at full power when the service current is below a threshold current;
- transmitting a signal from the control module to reduce the charging power from the EVSE to the electric vehicle when the service current exceeds the threshold current;
- monitoring the service line current by the control module; and
- transmitting a signal from the control module to restore full power from the EVSE to the electric vehicle when the service line current is below the threshold current.

17. The method of claim 16 further comprising transmitting a command control signal to the EVSE.

18. The method of claim 16 further comprising transmitting an on/off signal to the EVSE.

19. The method of claim 16 further comprising transmitting a level control signal to the EVSE.

20. The method of claim 16 further comprising reducing the charging power to the electric vehicle in proportion to the increase of the utility current load above the threshold current until a peak load is reached.

* * * * *